US010620369B2

(12) United States Patent
Kitahara

(10) Patent No.: US 10,620,369 B2
(45) Date of Patent: Apr. 14, 2020

(54) AMPLIFICATION OPTICAL FIBER AND LASER DEVICE

(71) Applicant: FUJIKURA LTD., Tokyo (JP)

(72) Inventor: Rintaro Kitahara, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 15/742,769

(22) PCT Filed: Mar. 6, 2017

(86) PCT No.: PCT/JP2017/008748
§ 371 (c)(1),
(2) Date: Jan. 8, 2018

(87) PCT Pub. No.: WO2018/003184
PCT Pub. Date: Jan. 4, 2018

(65) Prior Publication Data
US 2018/0203186 A1 Jul. 19, 2018

(30) Foreign Application Priority Data
Jun. 30, 2016 (JP) .................................. 2016-129763

(51) Int. Cl.
G02B 6/36 (2006.01)
G02B 6/036 (2006.01)
(Continued)

(52) U.S. Cl.
CPC ..... *G02B 6/03616* (2013.01); *G02B 6/03605* (2013.01); *G02B 6/03694* (2013.01);
(Continued)

(58) Field of Classification Search
CPC ............ G02B 6/03616; G02B 6/03605; G02B 6/03694; H01S 3/067; H01S 3/10007
See application file for complete search history.

(56) References Cited

U.S. PATENT DOCUMENTS 6,148,131 A * 11/2000 Geertman ......... C03B 37/02745
385/104
6,259,830 B1 * 7/2001 Bhagavatula ......... C03B 37/026
385/11
(Continued)

FOREIGN PATENT DOCUMENTS

JP 2001-013346 A 1/2001
JP 2001013346 A * 1/2001
(Continued)

OTHER PUBLICATIONS

Office Action issued in corresponding Japanese Patent Application No. 2017-513151 dated Oct. 17, 2017 (3 pages).
(Continued)

*Primary Examiner* — Thomas A Hollweg
*Assistant Examiner* — Mary A El-Shammaa
(74) *Attorney, Agent, or Firm* — Osha Liang LLP

(57) ABSTRACT

An amplification optical fiber according to the present invention includes: a core doped with an active element, through which multi-mode light propagates; an inner cladding that surrounds the core and has a refractive index lower than that of the core; and an outer cladding that surrounds the inner cladding and has a refractive index lower than that of the inner cladding. The inner cladding has a polygonal outline in a cross section perpendicular to the longitudinal direction, and the inner cladding has a permanent twist applied by turning around the central axis of the core.

7 Claims, 3 Drawing Sheets

(51) Int. Cl.
*H01S 3/067* (2006.01)
*H01S 3/10* (2006.01)
*H01S 3/08* (2006.01)
*G02B 6/02* (2006.01)

(52) U.S. Cl.
CPC .......... *H01S 3/067* (2013.01); *H01S 3/06729* (2013.01); *H01S 3/10007* (2013.01); *G02B 6/02047* (2013.01); *G02B 6/03633* (2013.01); *H01S 3/0675* (2013.01); *H01S 3/06733* (2013.01); *H01S 3/06754* (2013.01); *H01S 3/08045* (2013.01); *H01S 2301/03* (2013.01)

(56) References Cited

U.S. PATENT DOCUMENTS

| | | | | |
|---|---|---|---|---|
| 6,278,827 | B1* | 8/2001 | Sugiyama | G02B 6/001 385/123 |
| 6,766,075 | B1* | 7/2004 | King | H01S 3/06708 372/6 |
| 7,526,167 | B1* | 4/2009 | Minelly | G02B 6/03633 359/341.3 |
| 2005/0201651 | A1* | 9/2005 | Ellwood, Jr. | G02B 6/02 385/1 |
| 2005/0201674 | A1* | 9/2005 | Ellwood, Jr. | D03D 25/005 385/17 |
| 2005/0201715 | A1* | 9/2005 | Ellwood, Jr. | G02B 6/2746 385/147 |
| 2005/0213864 | A1* | 9/2005 | Ellwood, Jr. | G02B 6/036 385/6 |
| 2006/0133731 | A1* | 6/2006 | Sintov | G02B 6/2804 385/43 |
| 2009/0285247 | A1* | 11/2009 | Sintov | H01S 3/094003 372/6 |
| 2009/0285249 | A1* | 11/2009 | Gu | H01S 3/0057 372/18 |
| 2010/0079854 | A1* | 4/2010 | Tanigawa | G02B 6/02033 359/341.1 |
| 2011/0146071 | A1* | 6/2011 | Zheng | G02B 6/2552 29/869 |
| 2011/0249319 | A1* | 10/2011 | Savage-Leuchs | G02B 6/02347 359/341.1 |
| 2013/0249319 | A1* | 9/2013 | Cummings | H01L 31/02021 307/131 |
| 2013/0308913 | A1* | 11/2013 | Tanigawa | G02B 6/02042 385/126 |
| 2013/0336343 | A1 | 12/2013 | Miyabe et al. | |
| 2015/0110452 | A1* | 4/2015 | Digiovanni | H01S 3/06729 385/124 |
| 2017/0235049 | A1* | 8/2017 | Deladurantaye | G02B 6/14 385/11 |

FOREIGN PATENT DOCUMENTS

| | | |
|---|---|---|
| JP | 2003-226540 A | 8/2003 |
| JP | 2011-060854 A | 3/2011 |
| JP | 2011-171619 A | 9/2011 |
| JP | 2016-149432 A | 8/2016 |
| WO | 2013/038794 A1 | 3/2013 |

OTHER PUBLICATIONS

Extended European Search Report issued in corresponding European Patent Application No. 17817645.9 dated Jan. 31, 2019 (7 pages).

Office Action issued in corresponding Japanese Patent Application No. 2018-525069 dated Apr. 9, 2019 (4 pages).

Office Action issued in corresponding Chinese application No. CN201780001373.2 dated Mar. 15, 2019 (5 pages).

* cited by examiner

AMPLIFICATION OPTICAL FIBER AND LASER DEVICE

BACKGROUND

Technical Field

The present invention relates to an amplification optical fiber and a laser device capable of suppressing occurrence of a skew mode while suppressing mode coupling.

Background Art

Fiber laser devices are excellent in focusing performance, produce a small beam spot of light having high power density, and are therefore used in various fields such as the laser processing field and the medical field. In such a fiber laser device, a rare earth-doped fiber having a core doped with a rare earth element is used. Typically, a double-clad structure is applied to a rare earth-doped fiber so that more pumping light enter the core. A rare earth-doped fiber having a double-clad structure includes a core doped with a rare earth element, inner cladding surrounding the core, and outer cladding surrounding the inner cladding and having a refractive index lower than that of the inner cladding. Pumping light having entered the inner cladding is reflected by an interface between the inner cladding and the outer cladding toward the core, then enters the core, and pumps the rare earth element with which the core is doped.

When, however, the inner cladding of the rare earth-doped fiber having the double-clad structure as described above has a circular cross section, the pumping light may continue to be reflected by the interface between the inner cladding and the outer cladding at a constant angle and propagate through the inner cladding without entering the core. A light ray propagating through cladding without passing through the core is called a skew ray. When a skew ray occurs, the amount of pumping light entering the core becomes smaller, and thus the rare earth element with which the core is doped is less likely to be pumped.

Patent Literature 1 below, for example, discloses a technology for suppressing occurrence of a skew mode, in which an optical fiber with cladding having a polygonal cross-sectional shape is twisted around the central axis and fixed. As a result of twisting and fixing polygonal cladding in this manner, pumping light propagating through the cladding will continue to be reflected by the outer surface of the cladding at varying reflection angles, which will make the pumping light more likely to enter the core.

[Patent Literature 1] JP2001-13346 A

In recent years, there have been demands for higher output power of fiber laser devices. If, however, the power of light propagating through an optical fiber is increased, nonlinear optical effects such as stimulated Raman scattering become likely to occur in the optical fiber. A large mode area (LMA) fiber is proposed as a fiber capable of increasing the threshold of occurrence of such a nonlinear optical effect. Since, however, multi-mode light propagates through a core in an LMA fiber, the beam quality may be degraded by mode coupling.

The propagation of multi-mode light through the core and the occurrence of mode coupling, however, are not considered for the optical fiber disclosed by Patent Literature 1. For example, if an optical fiber is twisted and fixed as disclosed in Patent Literature 1, elastic stress caused by the twisting of the optical fiber produces a photoelastic effect. As a result, the refractive index of the core fluctuates unevenly, which will make mode coupling of light propagating through the core more likely to occur.

SUMMARY

One or more embodiments of the present invention provide an amplification optical fiber and a laser device capable of suppressing occurrence of a skew mode while suppressing mode coupling.

An amplification optical fiber according to one or more embodiments of the present invention includes: a core doped with an active element, through which multi-mode light can propagate; inner cladding surrounding the core and having a refractive index lower than a refractive index of the core; and outer cladding surrounding the inner cladding and having a refractive index lower than the refractive index of the inner cladding, wherein the inner cladding has a polygonal outline in a cross section perpendicular to a longitudinal direction, and the inner cladding has a permanent twist around a central axis of the core.

A laser device according to one or more embodiments of the present invention includes the amplification optical fiber and at least one light source configured to emit light that propagates through the optical fiber.

In the amplification optical fiber according to one or more embodiments, multi-mode light can propagate through the core, and the core can have a large diameter. This allows the amplification optical fiber to suppress occurrence of nonlinear optical effects such as stimulated Raman scattering even in a case where the amplification optical fiber is applied to a high-power laser device. The inner cladding is sandwiched by the core having a refractive index higher than that of the inner cladding and the outer cladding having a refractive index lower than that of the inner cladding, and pumping light having entered the inner cladding can thus be made to enter the core. Furthermore, the twist applied to the inner cladding having the polygonal outline in the cross section perpendicular to the longitudinal direction facilitates repeated reflection of pumping light propagating through the inner cladding by the interface between the inner cladding and the outer cladding at varying reflection angle. This facilitates pumping light having entered the inner cladding to enter the core. Thus, occurrence of the skew mode is suppressed. Consequently, in the amplification optical fiber, the active element with which the core is doped is easily pumped, and light propagating through the core is easily amplified. Furthermore, since the twist applied to the inner cladding is permanent, elastic stress caused by the twist suppresses uneven fluctuation of the refractive index of the core. This suppresses mode coupling of light propagating through the core. In this manner, the amplification optical fiber suppresses occurrence of the skew mode while suppressing mode coupling.

In addition, according to one or more embodiments, the twist has three or more but less than 30 turns per a length of one meter in a direction parallel to the longitudinal direction.

According to one or more embodiments, when the permanent twist applied to the inner cladding has three or more turns per the length of one meter in the direction parallel to the longitudinal direction, pumping light entering the inner cladding is further likely to be prevented from entering the skew mode. When the permanent twist applied to the inner cladding has less than 30 turns per the length of one meter in the direction parallel to the longitudinal direction, the drawing rate is prevented from being lowered during manufacture of the amplification optical fiber, which facilitates manufacture of the amplification optical fiber in which the inner cladding has a permanent twist. In addition, since a decrease in the drawing rate is prevented, an optical fiber preform is prevented from staying for a long time in a furnace, which prevents the active element such as ytterbium (Yb) with which the core is doped from crystallizing. Consequently, an increase in the transmission loss of the amplification optical fiber is prevented.

In addition, according to one or more embodiments, the relative refractive index difference between the inner cladding and the core is 0.08% or higher.

According to one or more embodiments, when the relative refractive index difference between the inner cladding and the core is 0.08% or higher, light is easily confined in the core, and the effective area of light propagating through the core is made smaller, which facilitates prevention of mode coupling of light propagating through the core.

Furthermore, according to one or more embodiments, the difference between the propagation constant of light in an $LP_{01}$ mode and that of light in an $LP_{11}$ mode propagating through the core is 1000/m or larger.

According to one or more embodiments, ideal laser light emitted by the laser device is a Gaussian beam where the proportion of light in the $LP_{01}$ mode, which is the fundamental mode, is high. When the difference between the propagation constant of light in the $LP_{01}$ mode and that of light in the $LP_{11}$ mode propagating through the core is 1000/m or larger, mode coupling of light in the $LP_{01}$ mode propagating through the core to light in the $LP_{11}$ mode due to an influence of slight bending or the like is prevented. Consequently, the proportion of light in the $LP_{01}$ mode in the laser light emitted by the laser device is easily increased.

Furthermore, according to one or more embodiments, the effective area of light propagating through the core is 300 $\mu m^2$ or larger.

According to one or more embodiments, when the effective area of light propagating through the core is 300 $\mu m^2$ or larger, occurrence of nonlinear optical effects such as stimulated Raman scattering is more likely to be suppressed even in a case where the amplification optical fiber is applied to a high-power laser device.

Furthermore, according to one or more embodiments, in the amplification optical fiber, the theoretical cutoff wavelength of light in an $LP_{03}$ mode is 1.3 $\mu m$ or smaller.

According to one or more embodiments, mode coupling may occur not only during propagation of light through an optical fiber but also at connection points between optical fibers. If the axes of optical fibers connected with each other are aligned, mode coupling of light in the $LP_{01}$ mode, which is the fundamental mode, to light in a mode such as the $LP_{11}$ mode or an $LP_{21}$ mode having non-axisymmetric intensity distribution is less likely to occur. Mode coupling of light in the $LP_{01}$ mode to light in the $LP_{02}$ mode, the $LP_{03}$ mode, or the like having axisymmetric intensity distribution is, however, more likely to occur than mode coupling to light in a mode having non-axisymmetric intensity distribution. Thus, when the theoretical cutoff wavelength of light in the $LP_{03}$ mode is 1.3 $\mu m$ or smaller, at least light in the $LP_{03}$ mode is more likely to be cut off while propagating through the optical fiber. Consequently, the beam quality of laser light emitted from the optical fiber is prevented from being degraded by mode coupling.

As described above, according to one or more embodiments of the present invention, an amplification optical fiber and a laser device capable of suppressing occurrence of a skew mode while suppressing mode coupling are provided.

DETAILED DESCRIPTION

Figure 1:
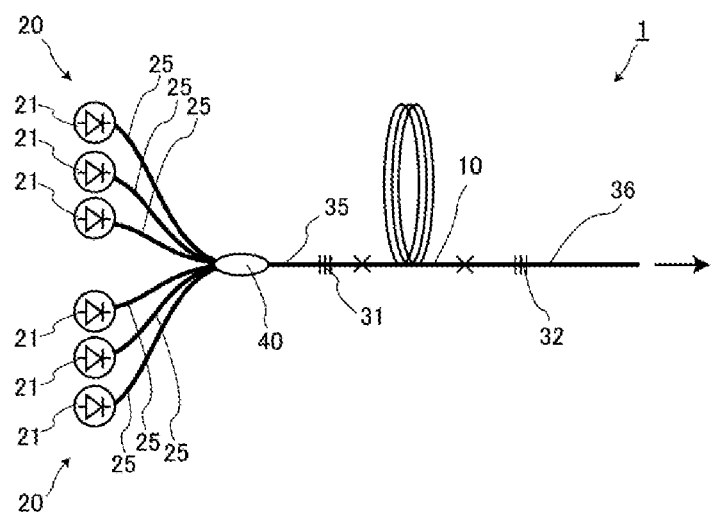
FIG. 1 is a schematic diagram illustrating a laser device according to one or more embodiments of the present invention.

Embodiments of an amplification optical fiber and a laser device according to the present invention will be described below in detail with reference to the drawings. The embodiments presented below are not to limit interpretation of the present invention, but to make the present invention easier to understand. The present invention can be modified or improved without departing from the scope of the invention. For easier understanding, a scale in the drawings may be different from that in the description below.

FIG. 1 is a diagram describing a laser device according to one or more embodiments of the present invention. As illustrated in FIG. 1, a laser device 1 includes, as main components, an amplification optical fiber 10, a pumping light source 20, an optical combiner 40, an optical fiber 35 connected to one end of the amplification optical fiber 10, a first FBG 31 provided in the optical fiber 35, an optical fiber 36 connected to the other end of the amplification optical fiber 10, and a second FBG 32 provided in the optical fiber 36, in which the amplification optical fiber 10, the first FBG 31, and the second FBG 32 constitutes a cavity.

In one or more embodiments of the present invention, the pumping light source 20 is constituted by a plurality of laser diodes 21, which are Fabry-Perot semiconductor lasers of a GaAs semiconductor material and emit pumping light having a center wavelength of 915 nm, for example. Each of the laser diodes 21 of the pumping light source 20 is connected to an optical fiber 25, and pumping light emitted by the laser diodes 21 propagates as multi-mode light, for example, through the optical fibers 25.

Figure 2:
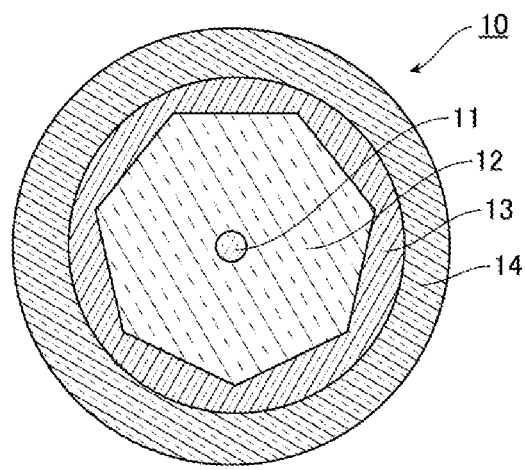
FIG. 2 is a view illustrating a cross section perpendicular to the longitudinal direction of an amplification optical fiber illustrated in FIG. 1.

FIG. 2 is a view illustrating a cross section perpendicular to the longitudinal direction of the amplification optical fiber 10 illustrated in FIG. 1. As illustrated in FIG. 2, the amplification optical fiber 10 includes, as main components, a core 11, inner cladding 12 surrounding the outer surface of the core 11 without any gap therebetween, outer cladding 13 covering the outer surface of the inner cladding 12, and a coating layer 14 covering the outer cladding 13, which is a so-called double-clad structure. The inner cladding 12 has a refractive index lower than that of the core 11, and the outer cladding 13 has a refractive index lower than that of the inner cladding 12.

A material of the core 11 may be fused silica doped with an element such as germanium (Ge) that increases the refractive index and an active element such as ytterbium (Yb) that is pumped by pumping light emitted by the pumping light source 20, for example. Such an active element may be a rare earth element, examples of which include thulium (Tm), cerium (Ce), neodymium (Nd), europium (Eu), and erbium (Er), in addition to Yb. Examples of the active element also include bismuth (Bi) or the like in addition to the rare earth element.

The inner cladding 12 has a heptagonal outline in cross section perpendicular to the longitudinal direction. The inner cladding 12 also has a permanent twist around the central axis of the core 11. Specifically, the inner cladding 12 has a twist around the central axis of the core 11, which is also maintained in a state in which no external force is applied. Such a permanent twist is formed in drawing the amplification optical fiber 10, which will be described later in examples. A material for the inner cladding 12 may be pure fused silica without any dopant, for example. Note that the material of the inner cladding 12 may be doped with an element such as fluorine (F) that lowers the refractive index.

The outer cladding 13 is made of resin or fused silica, where the resin may be ultraviolet curable resin, for example, and the fused silica may be fused silica doped with a dopant such as fluorine (F) that lowers the refractive index, for example, so that the refractive index is still lower than that of the inner cladding 12.

A material for the coating layer 14 may be ultraviolet curable resin, for example. When the outer cladding 13 is made of resin, the ultraviolet curable resin of the coating layer 14 is different from the resin of the outer cladding.

The amplification optical fiber 10 is a multi-mode fiber, in which light can propagate through the core 11 as multi-mode light. In addition to light in an $LP_{01}$ mode, which is a fundamental mode, light in second or higher order modes propagates through the core 11. For example, light in six or more LP modes propagates through the core 11.

The optical fiber 35 connected to one end of the amplification optical fiber 10 includes, as main components, a core doped with no active element, inner cladding surrounding the outer surface of the core without any gap therebetween, outer cladding covering the outer surface of the inner cladding, and a coating layer covering the outer cladding. The core of the optical fiber 35 has substantially the same structure as that of the core 11 of the amplification optical fiber 10 except that no active element is added. The core of the optical fiber 35 is connected with the core 11 of the amplification optical fiber 10, and the inner cladding of the optical fiber 35 is connected with the inner cladding 12 of the amplification optical fiber 10. The core of the optical fiber 35 is also provided with the first FBG 31, which is a first mirror. In this manner, the first FBG 31 is provided on one side of the amplification optical fiber 10. The first FBG 31 has portions where the refractive index is high at constant intervals along the longitudinal direction of the optical fiber 35, and is configured such that adjustment of the intervals allows at least light of a certain wavelength to be reflected among light emitted by the active element of the amplification optical fiber 10 in a pumped state. The first FBG 31 has a reflectance higher than that of the second FBG 32, which will be described later, and reflects light of a desired wavelength at 90% or higher or at 99% or higher among light emitted by the active element. When the active element is ytterbium as mentioned above, the wavelength of light reflected by the first FBG 31 is 1090 nm, for example.

The optical fiber 36 connected to the other end of the amplification optical fiber 10 includes, as main components, a core doped with no active element, cladding surrounding the outer surface of the core without any gap therebetween, and a coating layer covering the outer surface of the cladding. The core of the optical fiber 36 is connected with the core 11 of the amplification optical fiber 10, and the cladding of the optical fiber 36 is connected with the inner cladding 12 of the amplification optical fiber 10. The core of the optical fiber 36 is also provided with the second FBG 32, which is a second mirror. In this manner, the second FBG 32 is provided on the other side of the amplification optical fiber 10. The second FBG has portions where the refractive index is high at constant intervals along the longitudinal direction of the optical fiber 36, and is configured to reflect at least light of a certain wavelength among light reflected by the first FBG 31 at a reflectance lower than that of the first FBG 31. The second FBG 32 reflects at least light of a certain wavelength among light reflected by the first FBG 31 at a reflectance of 5% to 50% or at a reflectance of 5% to 10%. Although nothing is connected with the other end of the optical fiber 36 opposite to the side of the amplification optical fiber 10 in one or more embodiments of the present invention, a glass rod or the like may be connected therewith.

At the optical combiner 40, cores of the respective optical fiber 25 and the inner cladding of the optical fiber 35 are connected with each other. Thus, the optical fibers 25 through which pumping light emitted by the respective laser diodes 21 propagates and the inner cladding 12 of the amplification optical fiber 10 are optically coupled to each other via the inner cladding of the optical fiber 35.

Next, operation and effects of the laser device 1 according to one or more embodiments of the present invention will be described.

First, when pumping light is emitted by each of the laser diodes 21 of the pumping light source 20, the pumping light enters the inner cladding 12 of the amplification optical fiber 10 via the inner cladding of the optical fiber 35. Pumping light having entered the inner cladding propagates mainly through the inner cladding 12, and pumps the active element with which the core 11 is doped while passing through the core 11. The pumped active element emits spontaneous emission light of a specific wavelength. When the active element is ytterbium, for example, this spontaneous emission light is light in a certain wavelength band including a wavelength of 1090 nm. The spontaneous emission light propagates through the core 11 of the amplification optical fiber 10, light of a certain wavelength among the spontaneous emission light is reflected by the first FBG 31, light of a wavelength to be reflected by the second FBG 32 among the reflected light is reflected by the second FBG 32, and thus reciprocates within the cavity. Then, while light reflected by the first FBG 31 and the second FBG 32 propagates through the core 11 of the amplification optical fiber 10, stimulated emission occurs, which amplifies the propagating light and causes laser oscillation when the gain and the loss in the cavity become equal to each other. A part of light resonating between the first FBG 31 and the second FBG 32 then passes through the second FBG 32 and is emitted from the end of the optical fiber 36.

Note that, the amplification optical fiber 10, multi-mode light can propagate through the core 11 as described above, and the diameter of the core 11 can thus be made larger. This allows the amplification optical fiber 10 to suppress occurrence of nonlinear optical effects such as stimulated Raman scattering even in a case where the amplification optical fiber 10 is applied to a high-power laser device 1. In addition, the twist applied to the inner cladding 12 around the central axis of the core 11 facilitates repeated reflection of pumping light propagating through the inner cladding 12 by the interface between the inner cladding 12 and the outer cladding 13 at varying reflection angle. Thus, occurrence of the skew mode is suppressed. Consequently, in the amplification optical fiber 10, since pumping light easily enters the core 11 and the active element with which the core 11 is doped is easily pumped, and light propagating through the core 11 is easily amplified. Furthermore, since the twist applied to the inner cladding 12 is permanent, elastic stress caused by the twist suppresses uneven fluctuation of the refractive index of the core 11. This suppresses mode coupling of light propagating through the core 11. As described above, the amplification optical fiber 10 suppresses occurrence of the skew mode while suppressing mode coupling.

The permanent twist applied to the inner cladding 12 has three or more but less than 30 turns per a length of one meter in a direction parallel to the longitudinal direction. When the permanent twist applied to the inner cladding 12 has three or more turns per the length of one meter in the direction parallel to the longitudinal direction, pumping light entering the inner cladding 12 is further likely to be prevented from entering the skew mode. When the permanent twist applied to the inner cladding 12 has less than 30 turns per the length of one meter in the direction parallel to the longitudinal direction, the drawing rate is prevented from being lowered during manufacture of the amplification optical fiber 10, which facilitates manufacture of the amplification optical fiber 10 in which the inner cladding 12 has a permanent twist. In addition, since a decrease in the drawing rate is prevented, an optical fiber preform is prevented from staying for a long time in a furnace, which prevents the active element such as ytterbium (Yb) with which the core 11 is doped from crystallizing. Consequently, an increase in the transmission loss of the amplification optical fiber 10 is prevented.

In addition, the relative refractive index difference between the inner cladding 12 and the core 11 is 0.08% or higher. When the relative refractive index difference between the inner cladding 12 and the core 11 is 0.08% or higher, light is easily confined in the core 11, and the effective area of light propagating through the core 11 is made smaller, which facilitates prevention of mode coupling of light propagating through the core 11.

Furthermore, the difference between the propagation constant of light in the $LP_{01}$ mode and that of light in an $LP_{11}$ mode propagating through the core 11 is 1000/m or larger. Ideal laser light emitted by the laser device 1 is a Gaussian beam where the proportion of light in the $LP_{01}$ mode, which is the fundamental mode, is high. When the difference between the propagation constant of light in the $LP_{01}$ mode and that of light in the $LP_{11}$ mode propagating through the core 11 is 1000/m or larger, mode coupling of light in the $LP_{01}$ mode propagating through the core 11 to light in the $LP_{11}$ mode due to an influence of slight bending or the like is prevented. Consequently, the proportion of light in the $LP_{01}$ mode in the laser light emitted by the laser device 1 is easily increased.

Furthermore, the effective area of light propagating through the core 11 is 300 $\mu m^2$ or larger. When the effective area of light propagating through the core 11 is 300 $\mu m^2$ or larger, occurrence of nonlinear optical effects such as stimulated Raman scattering is more likely to be suppressed even in a case where the amplification optical fiber 10 is applied to a high-power laser device 1.

Furthermore, in the amplification optical fiber 10, the theoretical cutoff wavelength of light in an $LP_{03}$ mode is 1.3 $\mu m$ or smaller. Mode coupling may occur not only during propagation of light through an optical fiber but also at connection points between optical fibers. If the axes of optical fibers connected with each other are aligned, mode coupling of light in the $LP_{01}$ mode, which is the fundamental mode, to light in a mode such as the $LP_{11}$ mode or an $LP_{21}$ mode having non-axisymmetric intensity distribution is less likely to occur. Mode coupling of light in the $LP_{01}$ mode to light in the $LP_{02}$ mode, the $LP_{03}$ mode, or the like having axisymmetric intensity distribution is, however, more likely to occur than mode coupling to light in a mode having non-axisymmetric intensity distribution. Thus, when the theoretical cutoff wavelength of light in the $LP_{03}$ mode is 1.3 $\mu m$ or smaller, at least light in the $LP_{03}$ mode is more likely to be cut off while propagating through the optical fiber. Consequently, the beam quality of laser light emitted from the amplification optical fiber 10 is prevented from being degraded by mode coupling.

Next, one or more embodiments of the present invention will be described in detail with reference to FIG. 3. Note that components that are identical or equivalent to those in one or more embodiments described above may be designated by the same reference numerals and redundant description may not be repeated unless otherwise particularly described.

Figure 3:
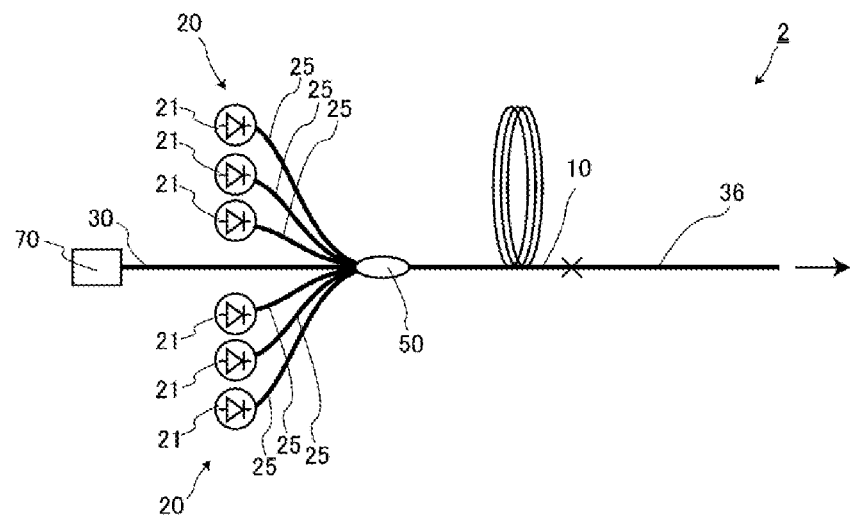
FIG. 3 is a schematic diagram illustrating a laser device according to one or more embodiments of the present invention.

FIG. 3 is a diagram illustrating a laser device according to one or more embodiments of the present invention. As illustrated in FIG. 3, a laser device 2 is different from the laser device 1 in that the laser device 2 is a master oscillator power amplifier (MO-PA) fiber laser device. Thus, the laser device 2 according to one or more embodiments includes a seed light source 70, and an optical fiber 30 connected with the seed light source 70.

The seed light source 70 is constituted by a laser diode, a fiber laser, or the like, for example. The optical fiber 30 includes, as main components, a core doped with no active element, cladding surrounding the outer surface the core without any gap therebetween, and a coating layer covering the outer surface of the cladding. Seed light emitted by the seed light source 70 propagates through the core of the optical fiber 30.

In one or more embodiments of the present invention, the respective optical fibers 25 together with the optical fiber 30 are connected to one end of the amplification optical fiber 10 at the optical combiner 50. Specifically, the core 11 of the amplification optical fiber 10 and the core of the optical fiber 30 are connected with each other such that the core of the optical fiber 30 is optically coupled to the core 11 of the amplification optical fiber 10. Thus, seed light emitted by the seed light source 70 enters the core 11 of the amplification optical fiber 10 via the core of the optical fiber 30 and propagates through the core 11. In addition, the cores of the respective optical fibers 25 and the inner cladding 12 of the amplification optical fiber 10 are connected with each other such that the cores of the respective optical fibers 25 are optically coupled to the inner cladding 12 of the amplification optical fiber 10. Thus, pumping light emitted by each of the laser diodes 21 of the pumping light source 20 enters the inner cladding 12 of the amplification optical fiber 10 via the optical fibers 25, propagates mainly through the inner cladding 12, and pumps the active element with which the core 11 is doped. Seed light propagating through the core 11 is therefore amplified by stimulated emission of the pumped active element, and the amplified seed light is emitted as emitted light from the amplification optical fiber 10. Light emitted from the amplification optical fiber 10 is emitted via the optical fiber 36.

In one or more embodiments of the present invention, use of the amplification optical fiber 10 suppresses occurrence of the skew mode while suppressing mode coupling.

While various embodiments of the present invention have been described above by reference to the embodiment as an example, the present invention is not limited thereto. For example, an example in which the inner cladding 12 has a heptagonal outline in cross section perpendicular to the longitudinal direction has been presented in the embodiments described above. The outline of the inner cladding 12 in cross section perpendicular to the longitudinal direction, however, is not limited and may be any polygonal shape such as a hexagonal or octagonal shape.

EXAMPLES

Embodiments of the present invention will be more concretely explained below with reference to examples and a comparative example, but the present invention is not limited thereto.

Example 1

An optical fiber corresponding to the amplification optical fiber 10 was produced in the following method. First, an optical fiber preform made of glass having the same refractive index profile as the core 11 and the inner cladding 12 of the amplification optical fiber 10 was provided. Specifically, an optical fiber preform in which the outer surface of a columnar material to be the core 11 is surrounded by a material of a heptagonal prism to be the inner cladding 12 without any gap therebetween was provided. Subsequently, the optical fiber preform was suspended in such a manner that the longitudinal direction of the optical fiber preform is vertical. The optical fiber preform was then placed in a drawing furnace, and a bottom end part of the optical fiber preform was heated. Subsequently, glass melted from the bottom end part of the heated optical fiber preform was drawn from the drawing furnace at a predetermined drawing rate and cooled. In this process, drawing was performed while rotating the optical fiber preform around the central axis, so that a permanent twist of one turn per a length of one meter in a direction parallel to the longitudinal direction was applied to the inner cladding 12. Thereafter, the outer surface of the inner cladding 12 was coated with the outer cladding 13 and the coating layer 14 made of ultraviolet curable resin or the like, and an amplification optical fiber according to Example 1 was thus produced.

Note that, as shown in Table 1 below, the optical fiber according to Example 1 had the following parameters: a relative refractive index difference (core Δ) between the core and the inner cladding of 0.12%, a difference (Δβ) in propagation constant between light in the $LP_{01}$ mode and light in the $LP_{11}$ mode propagating through the core of 2200/m, an effective area ($A_{eff}$) of light propagating through the core of 350 μm², and a theoretical cutoff wavelength ($\lambda_{ct}(LP_{03})$) of light in the $LP_{03}$ mode of 0.87 μm.

Example 2

An amplification optical fiber was produced similarly to Example 1 except that the rotating rate of the optical fiber preform during drawing was changed, so that a permanent twist of 3.3 turns per a length of one meter in the direction parallel to the longitudinal direction was applied to the inner cladding 12.

Example 3

An amplification optical fiber was produced similarly to Example 1 except that the rotating rate of the optical fiber preform during drawing was changed, so that a permanent twist of 5 turns per a length of one meter in the direction parallel to the longitudinal direction was applied to the inner cladding 12.

Examples 4 to 16

In Examples 4 to 16, amplification optical fibers were produced with the parameters changed as shown in Table 1 below. In addition, the rotating rate of the optical fiber preform during drawing is changed, so that a permanent twist of 7.5 turns per a length of one meter in the direction parallel to the longitudinal direction was applied to the inner cladding 12. The other conditions were the same as those in Example 1 in producing the amplification optical fibers according to Examples 4 to 16.

Comparative Example 1

An amplification optical fiber was produced similarly to Example 1 except that the optical fiber preform was not rotated during drawing.

TABLE 1

|  | Core Δ [%] | Δβ [m⁻¹] | $A_{eff}$ [μm²] | $\lambda_{ct}(LP_{03})$ [μm] |
|---|---|---|---|---|
| COMPARATIVE EXAMPLE 1 | 0.12 | 2200 | 350 | 0.87 |
| Example 1 | 0.12 | 2200 | 350 | 0.87 |
| Example 2 | 0.12 | 2200 | 350 | 0.87 |
| Example 3 | 0.12 | 2200 | 350 | 0.87 |
| Example 4 | 0.16 | 1091 | 704 | 1.29 |
| Example 5 | 0.16 | 1396 | 543 | 1.28 |
| Example 6 | 0.13 | 1545 | 495 | 0.90 |
| Example 7 | 0.13 | 1555 | 490 | 0.93 |
| Example 8 | 0.13 | 1636 | 470 | 0.93 |
| Example 9 | 0.10 | 1649 | 468 | 0.80 |
| Example 10 | 0.14 | 1700 | 451 | 0.92 |
| Example 11 | 0.14 | 1763 | 438 | 0.93 |
| Example 12 | 0.13 | 1821 | 424 | 0.94 |
| Example 13 | 0.14 | 1862 | 414 | 0.94 |
| Example 14 | 0.14 | 1864 | 412 | 0.97 |
| Example 15 | 0.15 | 1975 | 386 | 0.96 |
| Example 16 | 0.13 | 2287 | 327 | 0.89 |

(Evaluation on Skew Mode Suppression Effect)

The skew mode suppression effect was evaluated by a method explained below for the amplification optical fibers according to Examples 1 to 16 and Comparative Example 1.

The skew mode suppression effect was evaluated by definition of a skew suppression index γ as follows. The skew suppression index γ was defined by the following expression (1).

$$\gamma = \alpha_L / \alpha_S \quad (1)$$

In the expression, $\alpha_L$ and $\alpha_S$ were obtained as follows. First, an amplification optical fiber was wound into a spiral form having an inner diameter of 130 mm. The optical fiber wound spirally in this manner will be hereinafter referred to as a fiber coil. As a result of winding the amplification optical fiber spirally, microbending becomes less likely to occur, and the skew mode suppression effect due to microbending is less likely to be produced. Thus, the skew mode suppression effect evaluated by the following method can be considered as being little affected by microbending.

Subsequently, light of a wavelength of 915 nm was made to be incident on an inner end of the fiber coil, and light emitted from an outer end of the fiber coil was measured with a power meter. The power of light incident on the fiber coil was measured in advance, so that loss of light in the fiber coil, that is, the amount of light absorbed by the amplification optical fiber was able to be obtained from the difference between the power of incident light and the power of light emitted from the outer end of the fiber coil.

Figure 4:
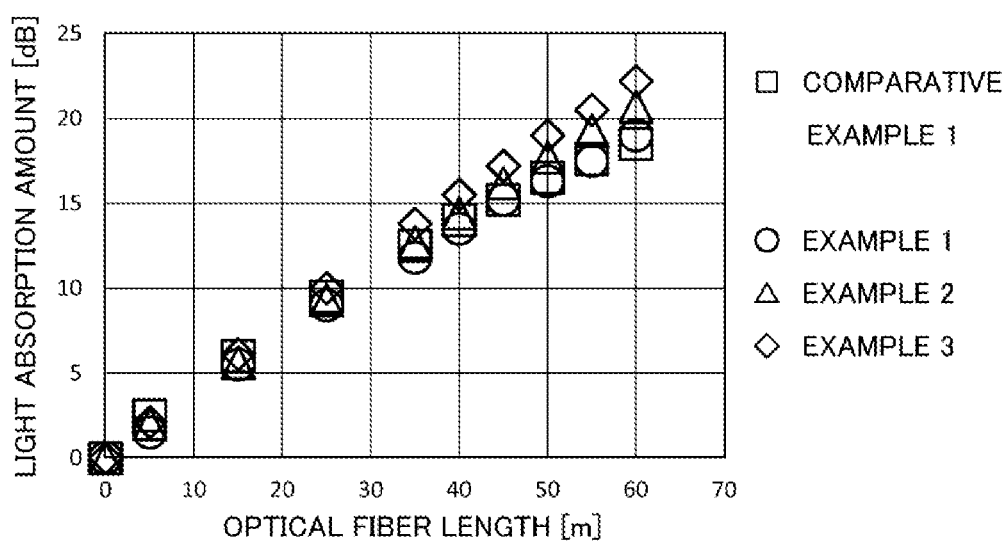
FIG. 4 is a graph showing relation between the length of an amplification optical fiber and the amount of light absorbed by the amplification optical fiber according to one or more embodiments of the present invention.

Subsequently, the fiber coil was cut from the outer end to have a smaller length, and the amount of light absorbed by the amplification optical fiber having a different length was obtained by the same method as described above. As a result, the amount of light absorption depending on the length of the amplification optical fiber was obtained. Results of light absorption amounts obtained for the amplification optical fibers according to Examples 1 to 3 and Comparative Example 1 are shown in FIG. 4. FIG. 4 is a graph showing relation between the length of an amplification optical fiber and the amount of light absorbed by the amplification optical fiber. For each of the optical fibers, the following expression (2) was obtained as an approximation curve of a quadratic function passing through the plots shown in FIG. 4.

$$y = ax^2 + bx + c \quad (2)$$

In the expression, since the light absorption amount in the amplification optical fiber can be considered as being at least about 21 dB, the value of x when y=21 is represented by L, and $\alpha_L$ is defined as the following expression (3).

$$\alpha_L = 21/L \quad (3)$$

In addition, $\alpha_s$ represents the amount of light absorbed by the amplification optical fibers where the skew mode does not occur. Specifically, $\alpha_s$ can represent the light absorption amount per unit length when the amplification optical fiber is short, and can be expressed by the following expression (4).

$$\alpha_s = \lim_{x \to 0} \frac{dy}{dx} = b \quad (4)$$

Evaluation on the skew mode suppression effect was performed on the respective amplification optical fibers by using $\gamma$, $\alpha_L$, and $\alpha_s$ defined as described above. It can be said that occurrence of the skew mode is more suppressed as the skew suppression index $\gamma$ is larger.

Figure 5:
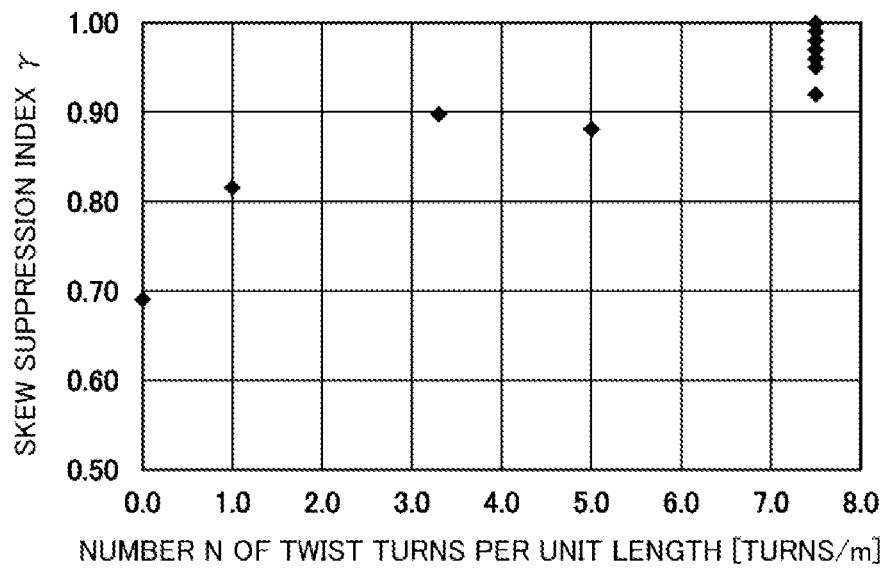
FIG. 5 is a graph showing relation between the number of twist turns per unit length of an inner cladding and a skew suppression index according to one or more embodiments of the present invention.

Table 2 below shows the number N of twist turns per unit length, $\gamma$, $\alpha_L$, and $\alpha_s$ of each of the amplification optical fibers according to Examples 1 to 16 and Comparative Example 1. Furthermore, the relation between the number N of twist turns and the skew suppression index $\gamma$ is shown in FIG. 5. In FIG. 5, the horizontal axis represents the number N of twist turns per unit length parallel to the longitudinal direction, and the vertical axis represents the skew suppression index $\gamma$. As can be seen in Table 2 and FIG. 5, the skew suppression index $\gamma$ is larger as the number N of twist turns is larger. It can be seen, however, that skew suppression index $\gamma$ does not increase so much when the number N of twist turns is 3 or larger. In Examples 4 to 16 in which the number N of twist turns is 7.5, the skew suppression index $\gamma$ is approximately 1, which shows that the skew mode is sufficiently suppressed.

TABLE 2

|  | N[twist turns/m] | $\alpha_s$ | $\alpha_L$ | $\gamma$ |
|---|---|---|---|---|
| COMPARATIVE EXAMPLE 1 | 0.0 | 0.42 | 0.29 | 0.69 |
| Example 1 | 1.0 | 0.38 | 0.31 | 0.82 |
| Example 2 | 3.3 | 0.39 | 0.35 | 0.90 |
| Example 3 | 5.0 | 0.42 | 0.37 | 0.88 |
| Example 4 | 7.5 | 1.08 | 1.05 | 0.98 |
| Example 5 | 7.5 | 1.12 | 1.08 | 0.96 |
| Example 6 | 7.5 | 1.20 | 1.20 | 1.00 |
| Example 7 | 7.5 | 1.31 | 1.20 | 0.92 |
| Example 8 | 7.5 | 1.20 | 1.19 | 0.99 |
| Example 9 | 7.5 | 0.94 | 0.94 | 1.00 |
| Example 10 | 7.5 | 1.32 | 1.30 | 0.98 |
| Example 11 | 7.5 | 1.16 | 1.12 | 0.97 |
| Example 12 | 7.5 | 1.31 | 1.25 | 0.95 |
| Example 13 | 7.5 | 1.16 | 1.15 | 0.99 |
| Example 14 | 7.5 | 1.19 | 1.17 | 0.99 |
| Example 15 | 7.5 | 1.14 | 1.13 | 1.00 |
| Example 16 | 7.5 | 1.09 | 1.09 | 1.00 |

The following can also be seen in FIG. 4. The light absorption amount in an amplification optical fiber varies more linearly relative to the length of the amplification optical fiber as the number N of twist turns per unit length is larger, and when the amplification optical fiber is longer, the light absorption amount in the amplification optical fiber is larger as the number N of twist turns is larger. This can be considered as being because occurrence of the skew mode is more suppressed as the number N of twist turns is larger.

(Evaluation on Mode Coupling Suppression Effect)

The mode coupling suppression effect was evaluated by a method explained below for the amplification optical fibers according to Examples 3 to 16 and Comparative Example 1.

$M^2$ (M square) was used for the evaluation on the mode coupling suppression effect. $M^2$ is an amount defined by a beam waist diameter and a divergence angle, and is always a value of 1 or larger. The proportion of fundamental mode light is high in laser light having a small $M^2$, and $M^2$ of an ideal Gaussian beam is 1.

Figure 6:
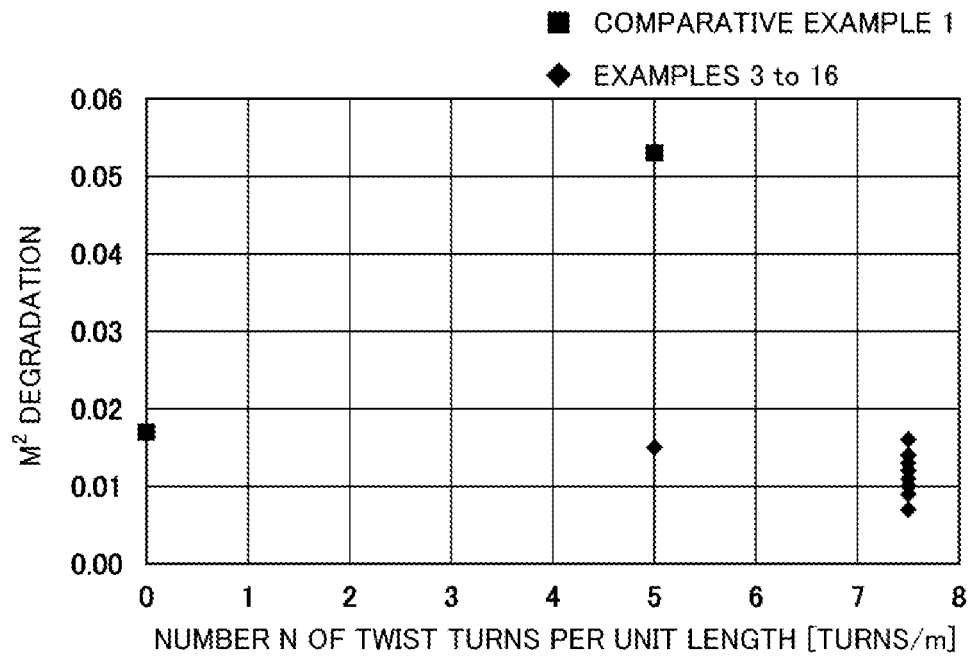
FIG. 6 is a graph showing relation between the number of twist turns per unit length of an inner cladding and the $M^2$ degradation of laser light according to one or more embodiments of the present invention.

Each of the amplification optical fibers according to Examples 3 to 16 and Comparative Example 1, which were cut into a length of 3 m, was connected to an end of an optical fiber, which was connected to a light source at the other end thereof, and $M^2$ was measured. $M^2$ of the optical fiber connected to the light source was measured in advance, and the difference from $M^2$ measured when each of the amplification optical fibers according to Examples 3 to 16 and Comparative Example 1 was connected was obtained as an $M^2$ degradation. It can be said that the mode coupling is more suppressed as the $M^2$ degradation is smaller. In addition, a twist of 15 turns was applied to the entire length (3 m) of the amplification optical fiber according to Comparative Example 1, and the evaluation was conducted thereon similarly to the above. Specifically, an elastic twist of the same number of turns (5 turns/m) as that of the amplification optical fiber according to Example 3 was applied to the amplification optical fiber according to Comparative Example 1, and the evaluation was conducted thereon. The evaluation results are shown in Table 3 below and FIG. 6. In FIG. 6, the horizontal axis represents the number N of twist turns per unit length, and the vertical axis represents the $M^2$ degradation.

TABLE 3

|  | N[Turns/m] | $M^2$ degradation[A.U.] |
|---|---|---|
| COMPARATIVE EXAMPLE 1 | 0.0 | 0.017 |

TABLE 3-continued

|  | N[Turns/m] | M² degradation[A.U.] |
|---|---|---|
| COMPARATIVE EXAMPLE 1 | 5.0 (Elastic Twist) | 0.053 |
| Example 3 | 5.0 | 0.015 |
| Example 4 | 7.5 | 0.012 |
| Example 5 | 7.5 | 0.013 |
| Example 6 | 7.5 | 0.014 |
| Example 7 | 7.5 | 0.016 |
| Example 8 | 7.5 | 0.012 |
| Example 9 | 7.5 | 0.014 |
| Example 10 | 7.5 | 0.013 |
| Example 11 | 7.5 | 0.007 |
| Example 12 | 7.5 | 0.009 |
| Example 13 | 7.5 | 0.012 |
| Example 14 | 7.5 | 0.016 |
| Example 15 | 7.5 | 0.010 |
| Example 16 | 7.5 | 0.011 |

As can be seen in Table 3 and FIG. 6, the amplification optical fibers according to Examples 3 to 16 to which permanent twists were applied have little difference in M² degradation therebetween as compared to the amplification optical fiber according to Comparative Example 1 to which no twist was applied. Furthermore, when the amplification optical fibers according to Examples 3 to 16 to which permanent twists were applied and the amplification optical fiber according to Comparative Example 1 to which an elastic twist was applied are compared, the M² degradations of the amplification optical fibers according to Examples 3 to 16 are clearly smaller. Consequently, it can be considered that mode coupling occurs in the case where an elastic twist is applied, and that mode coupling hardly occurs in the case where a permanent twist is applied as the amplification optical fibers according to Examples 3 to 16. Note that the M² degradation of about 0.02 of the amplification optical fiber according to Example 3 is considered as being due to the influence of mode coupling occurring at a connection point of optical fibers.

As described above, it can be seen that occurrence of the skew mode is suppressed and mode coupling is also suppressed by using an amplification optical fiber with inner cladding having a polygonal shape in cross section and having a permanent twist.

As described above, according to one or more embodiments of the present invention, an amplification optical fiber capable of suppressing occurrence of the skew mode while suppressing mode coupling is provided, which is expected to be used in the fields of processing machines, medical laser devices, and the like.

REFERENCE SIGNS LIST 1, 2 laser device
10 amplification optical fiber
11 core
12 inner cladding
13 outer cladding
14 coating layer
20 pumping light source
21 laser diode
31 first FBG
32 second FBG
40, 50 optical combiner
70 seed light source Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An amplification optical fiber comprising:
a core doped with an active element, through which multi-mode light propagates;
an inner cladding that surrounds the core and has a refractive index lower than a refractive index of the core; and
an outer cladding that surrounds the inner cladding and has a refractive index lower than the refractive index of the inner cladding, wherein
the inner cladding has a polygonal outline in a cross section perpendicular to a longitudinal direction, and
the inner cladding has a permanent twist, maintained without application of external force on the inner cladding, around a central axis of the core.

2. The amplification optical fiber according to claim 1, wherein the permanent twist has at least three but less than 30 turns per a length of one meter in a direction parallel to the longitudinal direction.

3. The amplification optical fiber according to claim 1, wherein a relative refractive index difference between the inner cladding and the core is 0.08% or higher.

4. The amplification optical fiber according to claim 1, wherein a difference in propagation constant between light in an $LP_{01}$ mode and light in an $LP_{11}$ mode propagating through the core is 1000/m or larger.

5. The amplification optical fiber according to claim 1, wherein light as an effective cross section of light propagating through the core is 300 μm² or larger.

6. The amplification optical fiber according to claim 1, wherein a theoretical cutoff wavelength of light in an $LP_{03}$ mode is 1.3 μm or smaller.

7. A laser device comprising:
the amplification optical fiber according to claim 1; and
at least one light source that emits light that propagates through the amplification optical fiber.

* * * * *